United States Patent
Martin et al.

(10) Patent No.: US 10,063,891 B2
(45) Date of Patent: Aug. 28, 2018

(54) IMAGE COMPRESSION METHOD WITH NEGLIGIBLE AND QUANTIFIABLE INFORMATION LOSS AND HIGH COMPRESSION RATIO

(71) Applicant: Université de Genève, Genève (CH)

(72) Inventors: Anthony Martin, Annemasse (FR); Hugo Zbinden, Genève (CH); Bruno Sanguinetti, Genève (CH)

(73) Assignee: Université de Genève, Genève (CH)

( * ) Notice: Subject to any disclaimer, the term of this patent is extended or adjusted under 35 U.S.C. 154(b) by 0 days.

(21) Appl. No.: 15/390,240

(22) Filed: Dec. 23, 2016

(65) Prior Publication Data

US 2017/0208347 A1  Jul. 20, 2017

(30) Foreign Application Priority Data

Dec. 23, 2015  (EP) .................................... 15202608

(51) Int. Cl.
| | |
|---|---|
| *G06K 9/36* | (2006.01) |
| *H04N 19/91* | (2014.01) |
| *H04N 19/44* | (2014.01) |
| *H04N 19/124* | (2014.01) |
| *H04N 19/176* | (2014.01) |

(52) U.S. Cl.
CPC ........... *H04N 19/91* (2014.11); *H04N 19/124* (2014.11); *H04N 19/176* (2014.11); *H04N 19/44* (2014.11)

(58) Field of Classification Search
CPC ........... G06T 5/002; G06T 2207/10016; G06T 5/003; G06T 11/60
USPC ....... 382/233, 235, 244, 249, 252, 260, 275; 345/555; 708/203
See application file for complete search history.

(56) References Cited

U.S. PATENT DOCUMENTS

| | | | | |
|---|---|---|---|---|
| 5,014,134 | A | 5/1991 | Lawton et al. | |
| 7,139,437 | B2 * | 11/2006 | Jones | G06T 5/20 382/261 |
| 7,194,143 | B2 * | 3/2007 | Sowa | G06T 5/20 348/E5.062 |
| 7,251,343 | B2 * | 7/2007 | Dorrell | G06F 21/64 382/100 |

(Continued)

FOREIGN PATENT DOCUMENTS

EP  1 215 909 A1  6/2002

OTHER PUBLICATIONS

Narroschke, Matthias, "Extending H.264/AVC by an adaptive coding of the prediction error," *The 25th Picture Coding Symposium*, 6 pgs. (Apr. 24, 2006.).

(Continued)

*Primary Examiner* — Yosef Kassa
(74) *Attorney, Agent, or Firm* — Christensen, Fonder, Dardi & Herbert PLLC (57) ABSTRACT

A data compression method wherein said data comprises noise and information, comprising a data acquisition step, a pre-compression parameter selection step, wherein said pre-compression parameters are linked to an information loss, a compression step, and a storage step, the compression step being characterized in that it comprises a lossy pre-compression for removing some noise of the data, carried out using the pre-compression parameters selected in the selection step followed by lossless compression for compressing the remaining data.

9 Claims, 4 Drawing Sheets

(56) References Cited

U.S. PATENT DOCUMENTS

| | | | | |
|---|---|---|---|---|
| 7,474,800 | B2* | 1/2009 | Moskvitin | H04N 19/196 375/E7.103 |
| 7,583,861 | B2* | 9/2009 | Hanna | G06F 19/321 382/305 |
| 7,684,483 | B2* | 3/2010 | Coleman | H04N 21/4143 375/240.01 |
| 7,706,624 | B2* | 4/2010 | Beazley | G06T 5/002 348/607 |
| 7,869,667 | B1* | 1/2011 | Wu | G06K 9/4609 382/113 |
| 8,086,062 | B2* | 12/2011 | Lin | G06T 5/20 382/260 |
| 8,279,308 | B1 | 10/2012 | Borg | |
| 8,462,991 | B1* | 6/2013 | Clements | G06F 17/3087 382/112 |
| 8,612,436 | B1* | 12/2013 | Grundman | G06F 17/30864 707/735 |
| 2010/0189180 | A1 | 7/2010 | Narroschke et al. | |

OTHER PUBLICATIONS

Ma, Siwei, "Rate-Distortion Analysis for H.264/AVC Video Coding and its Application to Rate Control," *IEEE Transactions on Circuits and Systems for Video Technology*, vol. 15, No. 12, pp. 1533-1544 (Dec. 2005).

Ohm, Jens-Rainer, et al., "Comparison of the Coding Efficiency of Video Coding Standards—Including High Efficiency Video Coding (HEVC)," *IEEE Transactions on Circuits and Systems for Video Technology*, vol. 22, No. 22, pp. 1669-1684 (Dec. 2012).

Li, Jin-Chao, et al., "Noise Estimation in Video Surveillance Systems," *2009 World Congress on Computer Science and Information Engineering*, pp. 578-582 (Mar. 31, 2009).

Algazi, V. Ralph, et al., "Quality measurement and use of preprocessing in image compression," *Signal Processing*, 70(3), pp. 215-229 (1998).

Eskicioglu, Ahmet M., et al., "Image Quality Measures and Their Performance," *IEEE Transactions on Communications*, vol. 43, No. 12, pp. 2959-2965 (Dec. 1995).

Hanhart, Philippe, et al., "Subjective quality evaluation of the upcoming HEVC video compression standard," *SPIE Optical Engineering+Applications*, International Society for Optics and Photonics, 13 pgs. (2012).

Lin, Weisi, et al., "Perceptual visual quality metrics: A survey," *J. Vis. Commun. Image R.*, 22, pp. 297-312 (2011).

Ye, Zhengmao, et al., "Quantitative Analysis of Information Loss in Digital Image Compression and Reconstruction," *Communication Software and Networks (ICCSN), 2011 3$^{rd}$ International Conference*, pp. 398-402 (May 2011).

Welch, Terry A., "A technique for High-Performance Data Compression," *Computer*, 17(6), pp. 8-19 (Jun. 1984).

Matsuda Ichiro, et al., "Lossless Coding of Still Images Using Minimum-Rate Predictors," *Image Processing, 2000, Proceedings 2000 International Conference*, vol. 1, pp. 132-135 vol. 1 (2000).

* cited by examiner

254: Decompression and usage

FIG. 4B

252: Compression

FIG. 4A

250: Parameter determination

IMAGE COMPRESSION METHOD WITH NEGLIGIBLE AND QUANTIFIABLE INFORMATION LOSS AND HIGH COMPRESSION RATIO

RELATED APPLICATION

The present application claims priority to European Patent Application No. 15202608.4, filed Dec. 23, 2015, the disclosure of which is hereby incorporated by reference herein in its entirety.

FIELD OF THE INVENTION

The present disclosure relates to data processing, and more specifically to the encoding and compression of image data.

BACKGROUND OF THE INVENTION

The amount of images produced worldwide is in constant growth. Photographic and video data, by its nature, consumes a large part of available digital resources, such as storage space and network bandwidth. Image compression technology plays a critical role by reducing storage and bandwidth requirements. There is therefore a need for high compression ratios whilst ensuring a quantifiably negligible loss of information.

Imaging is the technique of measuring and recording the amount of light L (radiance) emitted by each point of an object, and captured by the camera. These points are usually laid-out in a two-dimensional grid and called pixels. The imaging device records a measured digital value $d_{adc}(x, y)$ that represents $L(x, y)$, where $(x, y)$ are the coordinates of the pixel. The ensemble of values $d_{adc}(x, y)$ forms a raw digital imageM. Typically M consists of several tens of millions pixels and each $d_{adc}(x, y)$ is coded over 8 to 16 bits. This results in each raw image requiring hundreds of megabits to be represented, transferred and stored. The large size of these raw images imposes several practical drawbacks: within the imaging device (photo or video camera) the size limits the image transfer speed between sensor and processor, and between processor and memory. This limits the maximum frame rate at which images can be taken, or imposes the use of faster, more expensive and more power consuming communication channels. The same argument applies when images are copied from the camera to external memory, or transmitted over a communication channel. For example:

transmitting raw "4K" 60 frames per second video in real time requires a bandwidth of 9 Gbps; and storing one hour of such video requires 32 Tbits.

transmitting a single 40 MPixel photograph from a cube satellite over a 1 Mbps link takes 10 minutes.

backing up a 64 GByte memory from a photographic camera over a 100 Mbps Internet connection takes more than one hour.

To alleviate requirements on communication time and storage space, compression techniques are required. Two main classes of image compression exist:

A. Lossless image compression, where digital image data can be restored exactly, and there is zero loss in quality. This comes at the expense of very low compression ratios of typically 1:2 or less.

B. Lossy image compression, where the compressed data cannot be restored to the original values because some information is lost/excised during the compression, but which can have large compression ratios of 1:10 and higher. These compression ratios however come at the expense of loss of image quality, i.e. distortion, and the creation of image compression artifacts, i.e. image features that do not represent the original scene, but that are due to the compression algorithm itself.

Lossy image compression methods, such as those in the JPEG standard or used in wavelet compression, create distortion and artifacts. Distortion is the degree by which the decoded image Q, i.e. the result of compressing and decompressing the original image, differs from the original image M, and is usually measured as the root-mean-square of the differences in the values of each corresponding pixel between Q and M. Lossy compression typically also introduces artefacts, which are a particularly bad type of distortion that introduces image features in Q, i.e. correlations between different pixels, that are not present in M. Examples of artefacts are the "block" artifacts generated by block image compression algorithms like JPEG, but also ringing, contouring, posterizing. These artifacts are particularly nefarious, as they can be mistaken for image features. Lossy image compression algorithms, as described for example in prior art documents [1] and [2] cited below, typically consist of several steps. First, the image is transformed into a representation where the correlation between adjacent data point values is reduced. This transformation is reversible, so that no information is lost. For example, this step would be similar to calculating the Fourier coefficients, i.e. changing an image that is naturally encoded into a position space, into a special frequency space. The second step is referred to as quantization. This step truncates the value of the calculated coefficients to reduce the amount of data required to encode the image (or block, consisting of e.g. 16×16 pixels). This second step is irreversible, and will introduce quantization errors when reconstructing the image from the aforementioned coefficients. The quantization error will cause errors in the reconstructed image or block. Predicting or simulating what the error would be for any image or block is technically impossible, due to the extremely large number of values that such image or block may take. For example, a 16×16 block, with 16-bits per pixel, may take $2^{16 \times 16 \times 16} \cong 10^{4932}$ different values, impossible to test in practice. If the transformation is not restricted to blocks, but rather is a function of the entire image, the number of possible values becomes considerably larger.

More particularly, in standard lossy image compression techniques (e.g. document [1]), a lossless "image transformer" is first applied to the image, resulting in transformed image, where each data-point is a function of many input pixels and represents the value of a point in a space that is not the natural (x,y) position space of the image, but rather is a transformed space, for example a data-point might represent a Fourier component. A lossy "image quantizer" is applied on the transformed image as a second step. The amount of information loss cannot be accurately quantified in standard lossy image compression techniques for the above mentioned reason of the extremely large number of values that such image or block may take and is additionally complicated by the fact that the lossy operation is applied on a space that is not the natural image space.

Attempts have been made at characterizing the quality of the output of image compression algorithms. These efforts have typically focused on characterizing the quality of the reconstructed compressed image with respect to the human visual system, as reviewed in documents [2, 3, 4, 5] described below. Several metrics have been devised to characterize the performance of the compression algorithm, however, these metrics have significant drawbacks. One such drawback is that as they relate quality to the human visual system and human perception, which are highly dependent on the subject viewing the image, on the viewing conditions (e.g. eye-to-image distance, lighting of the image, environment lighting conditions, attention, angle, image size) as well as on the image rendering algorithms (e.g. debayering, gamma correction) and characteristics of the output device, such as display, projector screen, printer, paper etc. A second drawback of characterizing the quality of image compression algorithms with respect to the human visual systems or models thereof is that for such methods to be relevant, no further image processing must take place after image compression, as such processing would make some unwanted compression artifacts visible. For example, a compression algorithm might simplify dark areas of an image, removing detail, judging that such detail would not be visible by the human eye. If it is later decided to lighten the image, this detail will have been lost, resulting in visible artifacts. Yet another problem of the above-mentioned methods is that they are unsuitable for applications not aimed solely at image reproduction for a human observer, as for example are images for scientific, engineering, industrial, astronomical, medical, geographical, satellite, legal and computer vision applications, amongst others. In these applications data is processed in a different way as by the human visual system, and a feature invisible to the untrained human eye and therefore removed by the above-mentioned image compression methods, could be of high importance to the specific image processing system. For example, inappropriate image compression of satellite imagery could result in the addition or removal of geographical features, such as roads or buildings.

More recently, attempts at a more quantitative approach on the information loss in digital image compression and reconstruction have been made [6], in particular trying to examine information loss given by the most common image compression algorithm: Discrete Wavelet Transform (DWT), Discrete Fourier Transform (DFT) and 2D Principal Component Analysis (PCA). Several "quantitative" metrics are measured on several images compressed with several algorithms, for example quantitative measures of "contrast", "correlation", "dissimilarity", "homogeneity", discrete entropy, mutual information or peak signal-to-noise ratio (PSNR). However, the effect of different compression algorithms and parameters on these metrics highly depends on the input image, so that it is not possible to specify the performance of an algorithm, or even to choose the appropriate algorithm or parameters, as applying them on different images gives conflicting results. A further drawback of the methods described in [6], is that although these methods are quantitative in the sense that they output a value that might be correlated with image quality, it is unclear how this number can be used: these numbers cannot be used as uncertainties on the value, the compression methods do not guarantee the absence of artifacts, and it is even unclear how these numbers can be compared across different compression methods and input images. Also, these quantitative methods do not distinguish signal from noise, so that for example, a high value of entropy could be given by a large amount of retained signal (useful) or retained noise (useless).

The impossibility for the above-mentioned methods to achieve compression with quantifiable information loss arises from the fact that the space in which the algorithm looses data is very large (e.g. number of pixels in the image or block times the number of bits per pixel), and cannot therefore be characterized completely, as we have mentioned earlier.

Image-processing systems that act independently on individual (or small number of) pixels have been known and used for a long time. These systems typically provide a "look-up table" of values so that each possible input value is associated with an "encoded" output value. The main purpose of such processing has been to adapt the response curves of input and output devices, such as cameras and displays respectively. The functions used to determine the look-up tables have typically been logarithmic or gamma law, to better reflect the response curve of the human visual system as well as the large number of devices designed to satisfy the human eye, starting from legacy systems like television phosphors and photographic film, all the way to modern cameras, displays and printers that make use of such encodings. Although not their primary purpose, these encodings do provide an insignificant level of data compression, such as for example encoding a 12-bit raw sensor value over 10-bits, thus providing a compression ratio of 1.2:1, as described, for example in [7].

REFERENCES

[1] W. M. Lawton, J. C. Huffman, and W. R. Zettler. Image compression method and apparatus, 1991. U.S. Pat. No. 5,014,134.
[2] V. Ralph Algazi, Niranjan Avadhanam, Robert R. Estes, and Jr. Quality measurement and use of pre-processing in image compression. *Signal Processing*, 70(3):215-229, 1998.
[3] Ahmet M Eskicioglu and Paul S Fisher. Image quality measures and their performance. *Communications, IEEE Transactions on*, 43(12):2959-2965, 1995.
[4] Philippe Hanhart, Martin Rerabek, Francesca De Simone, and Touradj Ebrahimi. Subjective quality evaluation of the upcoming hevc video compression standard. 2010.
[5] Weisi Lin and C.-C. Jay Kuo. Perceptual visual quality metrics: A survey. *Journal of Visual Communication and Image Representation*, 22(4):297-312, 2011.
[6] Zhengmao Ye, H. Mohamadian, and Yongmao Ye. Quantitative analysis of information loss in digital image compression and reconstruction. In *Communication Software and Networks (ICCSN), 2011 IEEE 3rd International Conference on*, pages 398-402, May 2011.
[7] Lars U. Borg. Optimized log encoding of image data, 2012. U.S. Pat. No. 8,279,308.
[8] T. A. Welch. A technique for high-performance data compression. *Computer*, 17(6):8-19, June 1984.
[9] I. Matsuda, H. Mori, and S. Itoh. Lossless coding of still images using minimum-rate predictors. In *Image Processing, 2000. Proceedings. 2000 International Conference on*, volume 1, pages 132-135 vol. 1, 2000.

SUMMARY

In view of the above, it is therefore an object of the invention to provide a data compression method that permits to compress data with a high compression ratio with minimal information loss and to provide a technique for determining the information loss or the uncertainty with respect to the compression ratio.

A further object of the invention is to provide a decompression method adapted to decompress the data compressed by the compression method of the invention.

A further object of the invention is a data processing method comprising the compression method and the decompression method.

Here are described the embodiments of an image compression system and method that have a number of advantages:

Precise estimation of information loss at each chosen compression ratio.

A specific, quantifiable, bound for the compression ratio at which information loss remains negligible.

High compression ratio (e.g. 8:1) with negligible information loss.

No compression artifacts.

Both the pixel value and uncertainty ("error bar") on the pixel value can be recovered from the compressed image data and used in subsequent processing steps.

Allows the user to choose the desired compromise between information loss and level of compression.

The system can be characterized for all possible photographs, so that the amount of information lost can be predicted for any possible photograph.

To achieve the above advantages, the embodiments presented here distinguish the amount of image information from the amount of image data. Information is the useful knowledge acquired about the photographed object by means of the camera. Data is the digital representation of the measurement result, and contains information as well as noise and redundancy. In general, the amount of data captured will be much larger than the amount of information, so that it is possible to eliminate a large amount of data whilst eliminating only very little information.

Before going into its details in the next section, an overview of an embodiment is provided. First, the imaging system and compression method (e.g. sensor and processing) are characterized, for example by calibration, by simulation or theoretically, to determine the optimal pre-compression parameters. In contrast to the standard lossy image compression techniques, an appropriately-tuned lossy pre-compression, or quantizer, is applied directly on the acquired raw image data, as a pre-compression step. The amount of information lost by this quantizer can be calculated or measured, and appropriate parameters chosen to guarantee that such information loss remains negligible. Pre-compression removes most of the noise, which cannot, by its nature, be losslessly compressed, however, thanks to the properly chosen parameters, this step only removes a negligible amount of information. The appropriately-quantized image data, that now contains mostly information and little noise, is fed to a lossless compression algorithm as a second step. This algorithm will work very effectively, as more redundancy can be found in this clean data than could be found in the raw image sensor data that contained a large amount of noise. As now the second step is lossless, it will not reduce the amount of information present in the image and therefore does not need to be characterized for information loss.

The amount of information lost can be characterized as the increase in the uncertainty (i.e. the standard deviation, or "error bar") in the measured value of the radiance after the application of the compression and decompression algorithm, and define that this loss is negligible when the uncertainty on pixel values after decompression remains smaller than the standard deviation between the pixel values of consecutive photographs of the same subject.

The invention relates to a data compression method wherein the data comprises noise and information, comprising a data acquisition step, a pre-compression parameter selection step wherein said pre-compression parameters are linked to an information loss, a compression step, and a storage step, said compression step being characterized in that it comprises a lossy pre-compression for removing some noise of the data, carried out using the pre-compression parameters determined in the calibration step followed by lossless compression for compressing the remaining data.

Preferably, the compression method comprises a parameter determination step for determining pre-compression parameters by establishing a plot of the information loss vs. said pre-compression parameters.

Preferably, the parameter determination step determines pre-compression parameters adapted to remove most of the noise.

Preferably, the parameter determination step comprises a system characterization step outputting the amount of image information that is lost by the compression algorithm as a function of pre-compression parameters and a selection step, wherein a user chooses appropriate pre-compression parameters.

Preferably, the system characterization step comprises
setting the amount of light L to be measured, starting from L=0 (800).
acquiring a number of images (801) through an image sensor (306), an amplifier (310) and a converter (312).
calculating an input uncertainty $\sigma_i(L)/L$ on the data,
setting a pre-compression parameter g,
applying a lossy pre-compression followed by a lossless compression to the data;
decompress the data;
calculate output uncertainty on the data;
repeat the above steps by increasing L and g;
report information loss as a function of pre-compression parameter g.

The invention also relates to a data decompression method comprising
obtaining compressed data, that have been compressed by the compression method described above,
obtaining bound on information loss
decompressing the compressed data,
determining an uncertainty on the decompressed data according to the following relation:

$$\sigma_o(L_o) = \Delta(g, L_o) \times \sigma_i(L_i) = 1.15 \times 1/\sqrt{n} = 1.15 \times 1/\sqrt{d_o}$$

where:
$\Delta(L, g)$, $\Delta$ is the relative increase in uncertainty, here as a function of light hitting the pixel and pre-compression parameter, and on its own,
$d_o$ is the de-compressed digital value,
$\sigma_o(x, y)$ is the uncertainty (standard deviation) associated with the measurement estimate of the radiance $L(x, y)$ at point $(x, y)$, after compression,
$\sigma_i(x, y)$ is the uncertainty (standard deviation) associated with the measurement estimate of the radiance $L(x, y)$ at point $(x, y)$, before compression,
$L_{oo}(x, y)$ is the estimate of radiance $L(x,y)$ as derived from measurement, after compression,
$L_{oi}(x, y)$ is the estimate of radiance $L(x,y)$ as derived from measurement, before compression,
g is the pre-compression parameter, and
$n_j$ is the number of samples.

The invention also relates to a data processing method comprising the compression method followed by the decompression method described above.

The invention also relates to a computer program run on a computer or a dedicated hardware device, like a FPGA, adapted to carry out the data processing method described above.

DETAILED DESCRIPTION

Imaging System

Figure 1:
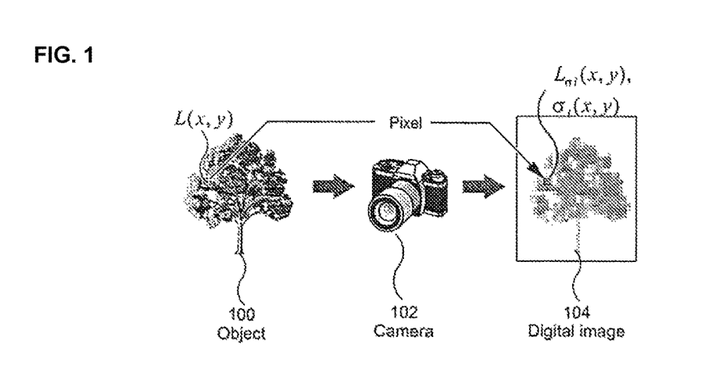
FIG. 1 shows a schematic overview of how an image to be treated by a method according to the present invention is typically acquired.
Figure 2:
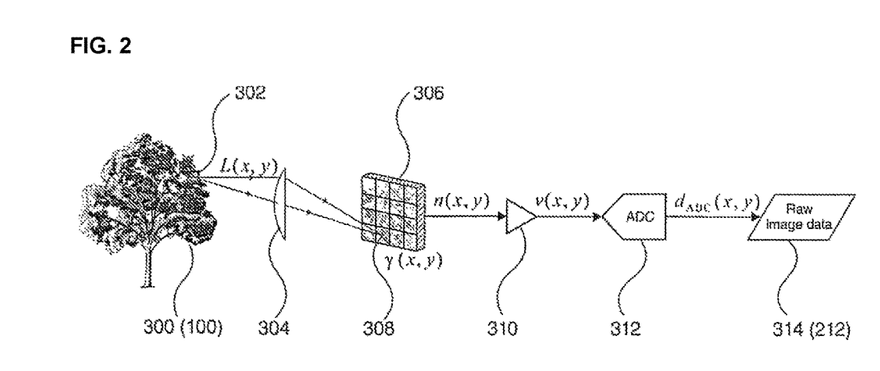
FIG. 2 shows a schematic overview of the typical steps of acquiring raw image data of an image to be treated by a method according to the present invention.

How an image is typically acquired is described more in detail as follows. This is illustrated in FIGS. 1 and 2. An imaging device aims at measuring (estimating) the amount of light emitted by a specific area (302) of an object. This amount of light shall be referred to as the radiance L(x, y) illuminating a pixel (308) with coordinates (x, y) on the image sensor (306). Light from this area is collected by an imaging system (304), such as a camera objective, and focused on a specific pixel (308) of the image sensor (306). During the camera's exposure time T, a number of photons γ(x, y) will impinge on the pixel (308), and generate a number of photoelectrons n(x, y). These electrons (a charge) will typically be translated to a voltage v(x, y) by an amplifier (310). This voltage is digitized by an analogue-to-digital converter (ADC) (312) that outputs a digital valued $d_{ADC}(x, y)$. The raw image data (314, 212) is the ensemble of values $d_{ADC}(x, y)$ for all (x, y) comprising the image. From $d_{ADC}(x, y)$ it is possible to estimate $L_{oi}(x, y)$, i.e. the value of the radiance L(x, y) with an uncertainty $\sigma_i(x, y)$. The uncertainty is given by noise, such as shot noise and read noise. If the sensor, amplifier and ADC are linear, the mean value $\langle d_{ADC}(x, y) \rangle$ can be related to the mean value of the number of photoelectrons $\langle n \rangle$ by proportionality constant $\zeta$ and an offset constant c:

$$\langle d_{ADC}(x,y) \rangle = \zeta \langle n(x,y) \rangle + c \qquad (EQ1)$$

Similarly, the mean number of photoelectrons $\langle n \rangle$ is proportional to the number of photons γ(x, y) that impinge on the pixel during the integration time T with a proportionality constant called the quantum efficiency QE:

$$\langle n(x,y) \rangle = QE \times \langle \gamma(x,y) \rangle \qquad (EQ2)$$

The number of photons γ(x, y) is proportional to the radiance L(x, y), i.e. the amount of luminous power emitted by the object by unit area and solid angle. γ(x, y) is also proportional to other constants, such as the observed area A (function of the imaging system (304) and pixel size), observed solid angle Ω (function of the imaging system (304)), exposure time T, and inversely proportional to photon energy E=hc/λ where h is Planck's constant and λ is the wavelength of the incident light. This can be summarized as:

$$\langle \gamma(x, y) \rangle = L(x, y) A \Omega T \frac{1}{E} \qquad (EQ3)$$

Substituting Equation (EQ3) into Equation (EQ2) and the resulting equation into Equation (EQ1), one obtains:

$$\langle d_{ADC}(x, y) \rangle = \frac{L(x, y) \zeta QE A \Omega T}{E} + c \qquad (EQ4)$$

Setting Z=ζQEAΩT/E, $$\langle d_{ADC}(x,y) \rangle = ZL(x,y) + c \qquad (EQ5)$$

So that L(x, y) can be directly evaluated from $\langle d_{ADC}(x, y) \rangle$ as:

$$L(x, y) = \frac{\langle d_{ADC}(x, y) \rangle - c}{Z} \qquad (EQ6)$$

And on for a single shot (i.e. without averaging) one may evaluate $L_{oi}(x, y)$ as:

$$L_{\sigma i}(x, y) = \frac{d_{ADC}(x, y) - c}{Z} \pm \sigma_i(x, y) \qquad (EQ7)$$

Equation (EQ7) serves as an example for a system that is very linear. If this is the case, and the sensor, amplifier and converter result in a shot-noise limited measurement, the number of photoelectrons will be Poisson-distributed, so that the uncertainty in photoelectron number will be $\Delta n = \sqrt{n}$, and the relative uncertainty $$\frac{\Delta n}{n} = \frac{1}{\sqrt{n}} = \sigma_i(x, y) / L_{\sigma i}(x, y).$$

If the sensor, amplifier or ADC presents non-linearity, it is necessary to calibrate them, for example by creating a look-up-table $LUT_{d \to L}$ and $LUT_{d \to \sigma i}$ that associates a value of L and $\sigma_i$ to each possible value of $d_{ADC}$. How this is done in practice is described as follows.

In conclusion, the raw data will be the recorded digital value $d_{adc}(x, y)$, the information acquired about the object radiance L(x, y) will have value $L_{oi}(x, y)$ with uncertainty $\sigma_i(x, y)$. When image data undergoes compression and decompression, resulting in the possibility to infer an output $L_{oo}(x, y)$ with an uncertainty $\sigma_o(x, y)$, it is then possible to quantify the amount of information lost by looking at the relative increase in uncertainty: $\sigma_o(x, y)/\sigma_i(x, y)$, i.e. the relative increase in error bars.

An overview of a preferred embodiment of the method of the present invention will now be described with reference to FIG. 3 as well as 4A, 4B, and 4C.

Figure 4A:
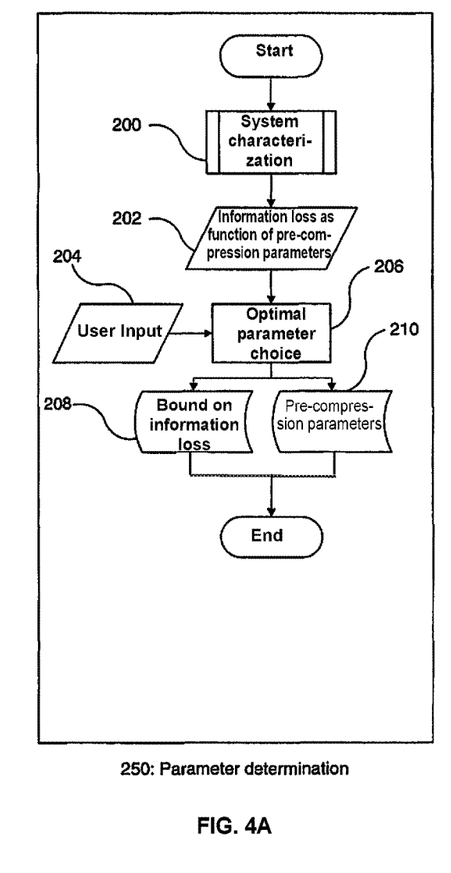
FIGS. 4A, 4B and 4C show, by way of corresponding schematic overviews, a data processing method according to the present invention which is preferably split into 3 phases, namely parameter determination, data compression, and data decompression.
Figure 4B:
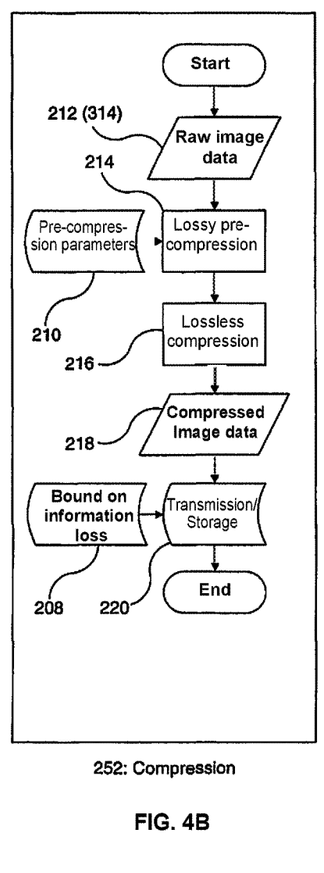
Figure 4C:
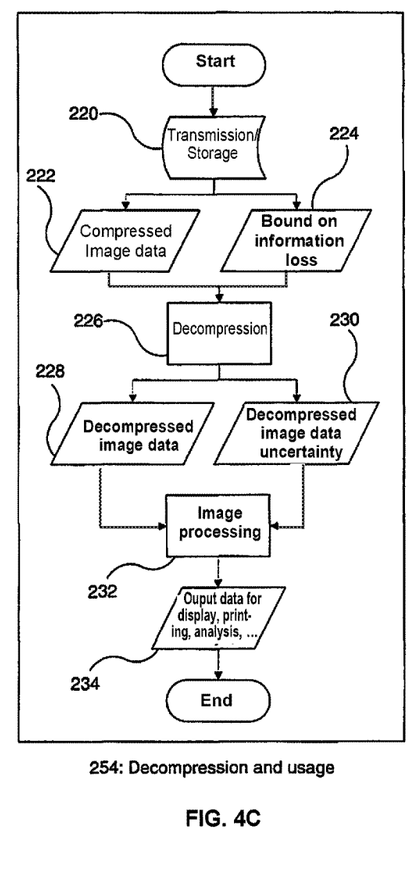

This preferred embodiment is a data processing method which is preferably split into 3 phases as depicted in FIGS. 4A, 4B and 4C.

1) The first phase also called "parameter determination" (250) and represented in FIG. 4A serves to determine pre-compression parameters (210) that achieve a high compression ratio while guaranteeing that the information lost is below a specific bound (208).

2) The second phase is the compression method of the present invention represented in FIG. 4B which compresses image data using the parameters (210) determined in the parameter determination phase (250). The compressed data are transmitted and/or stored (220).

3) The third phase is the decompression method of the present invention represented in FIG. 4C which recovers compressed data (222) from the transmission channel or storage (220), as well as the bound on information loss (224). This information is used to obtain decompressed data (228), as well as the uncertainty on this data (230). Both of these can be used for processing (232) and display or other usage (234).

It is important to note that even if the data processing method of the invention comprises these three phases, each single phase can be carried out independently from each other. Such that the present invention comprises a parameter determination method, a compression method, a decompression method as well as a data processing method comprising one or more of these three methods.

We will now describe the first phase of parameter determination.

Parameter Determination Phase for System Calibration

As shown in FIG. 4A, in order to carry out a system calibration allowing to determine the pre-compression parameters and the bound on the information loss, first, the camera system is characterized (200) to determine the amount of image information that is lost (202) by the compression algorithm as a function of pre-compression parameters. This characterization is described in detail here below with reference to FIG. 3. In a simple exemplary embodiment, that works well for shot-noise limited, linear systems, the pre-compression parameter will be a single variable g taking values between 1 (no compression and data loss) and infinity (high compression and all data lost). This parameter will be used in the pre-compression algorithm described in the compression phase detailed below.

Figure 5:
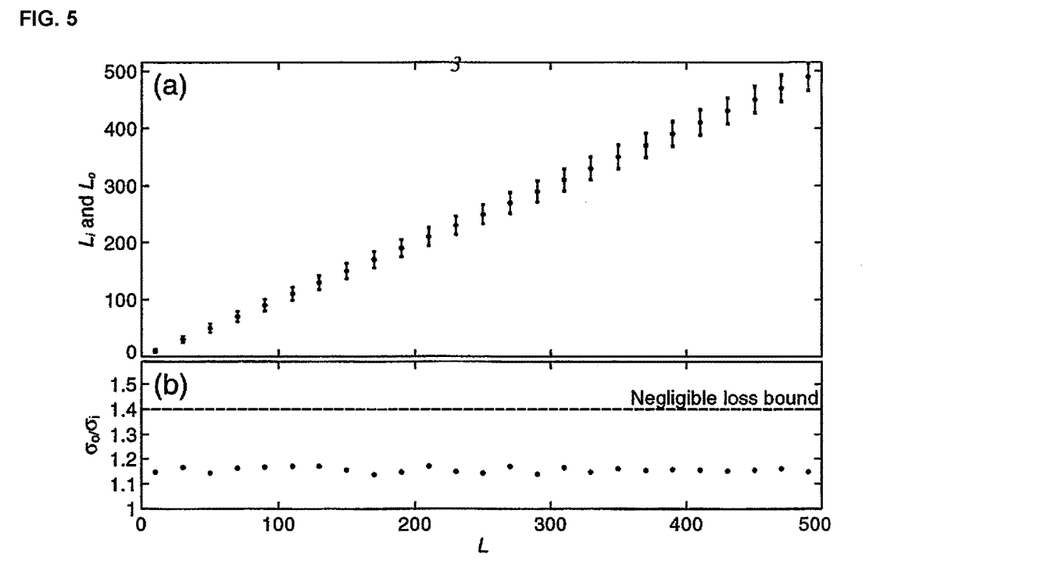
FIG. 5 shows the quantified uncertainty increase (information loss) bound as a function of radiance L, the units being normalized to the mean number of photoelectrons $\langle n \rangle$.
Figure 6:
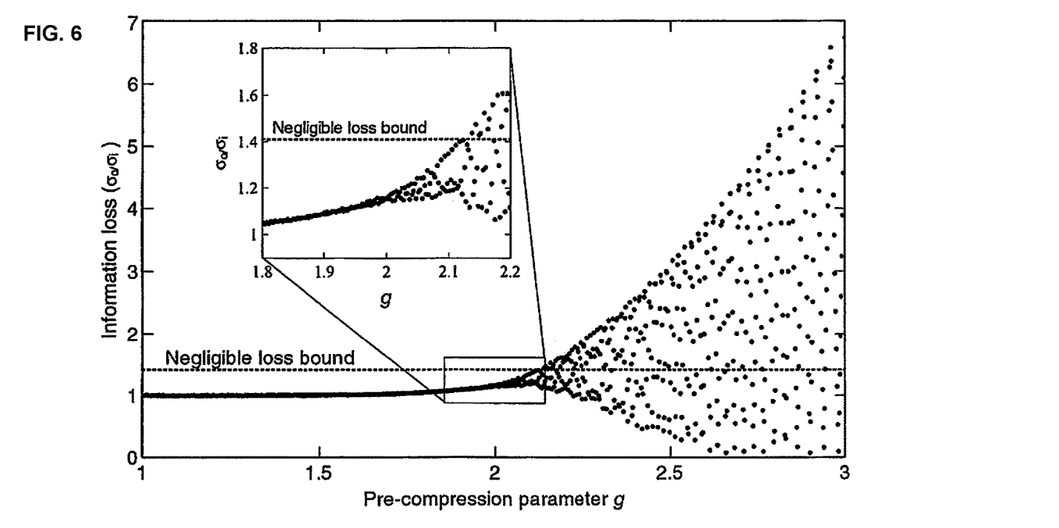
FIG. 6 shows the uncertainty/information loss as a function of an example of a pre-compression parameter g.

A sample output of this step is shown in FIG. 6 representing a plot of the uncertainty/information loss with respect to parameter g. With this data (202) in hand, and according to the preferences of the user (204), appropriate compression parameters are chosen. In the instance of FIG. 6, for example, the pre-compression parameter g can be increased up to a value of 2, with the amount of information lost remaining below the negligible loss bound. FIG. 5 shows the quantified uncertainty increase (information loss) bound (208) for values of L between 0 and 500 (here the units are normalized to the mean number of photoelectrons $\langle n \rangle$).

In the description below, the pre-compression parameters is a single parameter relating to a pre-defined pre-compression function; however, in general, it may be represented by multiple parameters, or the look-up-tables $LUT_{d \rightarrow L}$ and $LUT_{d \rightarrow \sigma_i}$. The selected parameters and associated uncertainty increase bounds are saved to be reused in the next phase: Compression.

System Characterization

Figure 3:
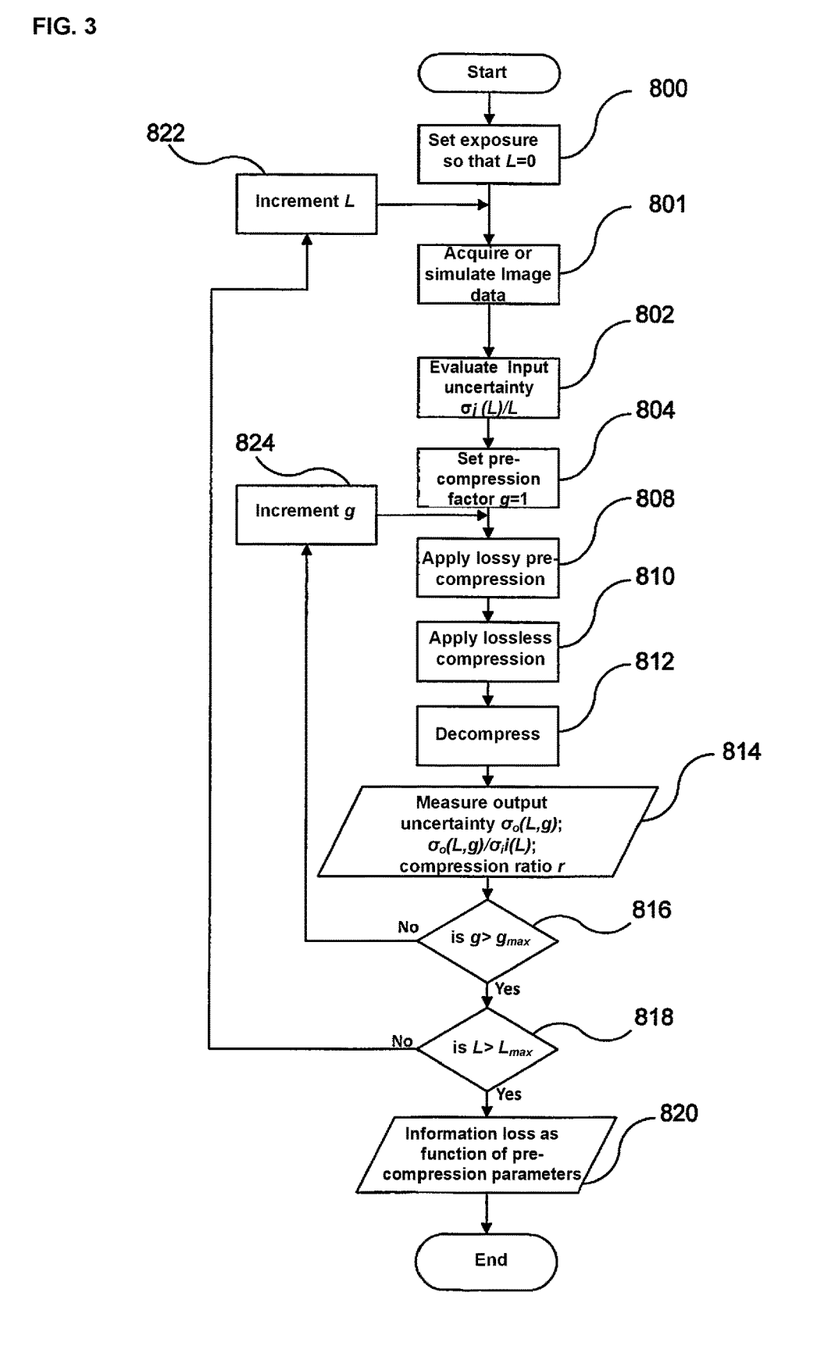
FIG. 3 shows a schematic overview of the system calibration step performed by a method according to the present invention in order to allow for determination of pre-compression parameters.

An embodiment of this procedure is shown in FIG. 3. System characterization evaluates the amount of information lost by the compression system as a function of compression parameter and input radiance L.

For clarity reason, a list of the symbols used here is available at the end of the present specification.

First, the amount of light to be measured is set, starting from L=0 (800), then, a number of images is acquired (801).

This can be done using the real image acquisition system, by simulating such a system, or by theoretical modeling. In this example, the data arising from a shot-noise limited linear sensor is simulated. Assuming linearity means that the number of photoelectrons n will be proportional to the radiance L to be measured (at constant T, Ω, QE, A, E): $\langle n \rangle = LZ/\zeta$. For simplicity of the simulation, $\zeta$ is set equal to 1 and c=0 so that $d_{ADC}=n$. For a shot-noise limited system, n will be distributed according to a Poisson distribution $N(LZ/\zeta)=N(\langle n \rangle)$ that has mean $\langle n \rangle$, variance $\langle n \rangle$ and standard deviation $\sqrt{\langle n \rangle}$. With the above simplifications, the relative error $\sigma_i/\langle L_i \rangle$ will be equivalent to the relative uncertainty in the measurement of the number of photoelectrons $\sqrt{\langle n \rangle}/n=1/\sqrt{n}$. To simulate sensor data in (801) for a specific value of $\langle n \rangle$, we generate a number of samples $n_1$ issued from $N(\langle n \rangle)$. Instead of simulating data, (801) may acquire data from the imaging system.

The relative input uncertainty $\sigma_i(L)/L$ is calculated or numerically computed as root-mean-square (RMS) difference between each $L_i$, the measured value of L, and the actual (set-point) value of L, divided by L itself (802).

A pre-compression parameter, or set of pre-compression parameters is chosen (804). In our simple example, a single parameter g is used. However, more in general, this could be a look-up-table (LUT) associating an output value of $L_o$ to each possible value of $L_i$.

Lossy pre-compression is then applied to each input measured value of $L_i$ (808). In this embodiment, the pre-compressed digital value $d_c$ is obtained from the function $$d_c \rightarrow \| n^{\frac{1}{g}} \|$$

where n is the number of photoelectrons on that sample, i.e.

$$n = \frac{ZL_i}{\zeta} \text{ or,}$$

with respect to the ADC output, $n=(d_{ADC}-c)/\zeta$. The double-line "brackets" symbolize taking the nearest integer. In this case, g represents the reduction factor in the number of bits required to encode each possible number of photoelectrons. For example, encoding a number of photoelectrons between 0 and $2^{16}-1=65535$ requires 16 bits. For g=1, no pre-compression would arise, and 16 bits would be required. For g=2, the number of encoding bits is reduced by a factor of 2, so that the result of the pre-compression can be encoded over 8 bits. More in general, any LUT can be applied.

A lossless compression algorithm may then be applied (810), either on a pixel-by-pixel basis, or on larger blocks, or on the entire pre-compressed image. The data to which this lossless compression is applied is called F. As after the lossy pre-compression is applied, the amount of data is reduced, but also, the entropy of such data is reduced (noise is removed) so that lossless compression will be very effective. In our example, we have used several algorithms, ranging from the universal and simple Lempel-Ziv-Welch (LZW) [8] to image-content-based algorithms such as minimum-rate predictors (MRP) [9]. The algorithm here can be chosen at will, as being lossless, it will not lose any information, and will not affect the uncertainty of the image. In some instances, if compression speed is of the essence, this step may be a simple "pass-through" not affecting the pre-compressed data at all.

In the next step (812), the output f of this lossless compression is decompressed to obtain F, then, the inverse function of the lossy compression is applied (or the inverse LUT). For example, the inverse of $$d_c \to \left\| n^{\frac{1}{g}} \right\|$$

is $d_o \to d_c^g$.

From the de-compressed output $d_o$ it is possible to calculate a value $L_o$ for the radiance, e.g. $L_o = d_o \zeta / Z$. In (814) the error that was introduced as the difference $L_o - L_i$ is calculated. This error can be estimated for several samples of the acquired image data, and the root-mean-square (RMS) of this error calculated as $\sigma_o(L, g)$, and compared to the input error (uncertainty) $\sigma_i(L)$ to obtain a well-defined, properly quantified, relative increase in uncertainty $\Delta(L, g) = \sigma_o(L, g)/\sigma_i(L)$. The compression ratio r can also be calculated as the size of the original image data divided by the size of output f of the lossless compression.

By repeating the above process for a number of image acquisition samples, for a number of compression factors g (816, 824) and for a number of Radiances, integration times or generated photoelectrons (818, 822), one obtains a characterization of the compression system (820), i.e. the amount of information lost $\Delta(L, g)$ as a function of pre-compression parameters g and pixel radiance L (or equivalently, photoelectron number n or pixel value $d_c$ or $d_o$, as all these are relate by known equations).

Sample results of this characterization are shown in FIG. 5, where g is varied at fixed L, and 6, where L is varied such as to produce between zero and 500 photoelectrons $\langle n \rangle$, and the pre-compression is held fixed at g=2. The results show that $\Delta(L, g) = \sigma_o(L, g)/\sigma_i(L) = 1.15$ across the range for all these settings. This is smaller than what was defined as the bound for negligible information loss, i.e. the RMS of the difference between consecutive measurements ("photographs") of the same pixel, of exactly the same subject taken with an ideal shot-noise-limited sensor, that is $\sqrt{2} \approx 1.41$.

Testing this pre-compression factor g=2, and therefore $\Delta=1.15$ on an image of a 10 EUR note, acquired with an ATIK383L scientific camera, the compression factors were as follows:
Original image file: 5,164,276 bytes
Lossless compressed original file (ZIP): 4,242,951 bytes.
Lossy Pre-compressed image: 2,580,219 bytes
Lossless compressed pre-compressed image (ZIP): 1,015,808 bytes
Lossless compressed pre-compressed image (MRP [9]): 544,336 bytes To give a compression ratio of 9.5:1 and increasing the uncertainty by a factor of only 1.15. FIG. 6 plots both the error-bars with the original uncertainty $\sigma_i$ and with the, barely distinguishably larger, output uncertainty $\sigma_o$, from which it is evident that this uncertainty increase is negligible.

It has to be noted that, when keeping parameters A, $\Omega$, T, E constant, shot noise will manifest itself with the number of photoelectrons n following a Poisson distribution with mean and variance $\langle n \rangle$ and with standard deviation $\sigma_i = \sqrt{\langle n \rangle}$.

Once, the system characterization is achieved and the pre-compression parameters are available, the user can select the required parameters and continue with the compression phase.

Compression Method

An embodiment of this compression method is illustrated in FIG. 4B (252). Pre-compression parameters (210) g and associated uncertainty increase bounds (208) $\Delta$ are taken from previous phase (250) "parameter determination". In this example, g=2, $\Delta=1.15$, however it may be different depending on the parameter estimation results. Raw image data is first acquired (212, 314), either from the image processing pipeline or from disk/memory. Then, a lossy pre-compression is applied (214) in the same way as described in step 808 of the section "System characterization", using pre-compression parameter g (210). Pre-compressed data is then losslessly compressed in step (216) such as to yield compressed image data (218) as described in step 810 of the section "System characterization". Compressed data is then stored or transmitted (220). The bound on information loss (208) may also be included into the stored/transmitted data for future use, or may be a pre-defined parameter for the system.

Once, the compression is achieved and the compressed data are stored or transmitted (that actually can be considered as a mobile storage in a channel), the user can decide to decompress the data to recover the data and therefore pass to the last phase that is the decompression method.

De-Compression Method and Usage

An embodiment of this method is illustrated in FIG. 4C (254) "Decompression and usage". First, the compressed data (222) are obtained from the transmission link or storage (220). Ideally, these data were compressed by the above compression method. The bound on information loss (224) is also obtained from the transmission link or storage, but could also be a pre-defined part of the system. This information is fed into a de-compression routine (226) that has already been described in step 812 of the section "System characterization". This step will output decompressed data (228), and the uncertainty on such de-compressed data (230).

As a matter of fact, using the example of the compression and decompression functions described in section "System characterization", the decompressed image data uncertainty (230) is calculated as $\sigma_o/\langle L_o \rangle = \Delta(g, L_o) \times \sigma_i/\langle L_i \rangle = 1.15 \times 1/\sqrt{n} = 1.15 \times 1/\sqrt{d_o}$ where $d_o$ is the decompressed data output for that pixel and $\Delta$ is preferably 1.15.

This data (228) and, optionally, the associated uncertainty (230), can then be used to effectively process the image (232), resulting in data to be output to display, printing, or further analysis or processing (234).

TABLE OF SYMBOLS

| Symbol | Description |
|---|---|
| L | Radiance of each point of an object |
| L(x, y) | Radiance of a point of the object corresponding to pixel coordinates (x, y) |
| $L_{oi}(x, y)$ | Estimate of radiance L(x, y) as derived from measurement, before compression. |
| $\sigma_i(x, y)$ | Uncertainty (standard deviation) associated with the measurement estimate of the radiance L(x, y) at point (x, y), before compression. |
| $L_{oo}(x, y)$ | Estimate of radiance L(x, y) as derived from measurement, after compression. |
| $\sigma_o(x, y)$ | Uncertainty (standard deviation) associated with the measurement estimate of the radiance L(x, y) at point (x, y), after compression. |
| $\gamma(x, y)$ | Number of photons impinging on pixel (image sensor element) at coordinates (x, y) |

-continued

| Symbol | Description |
|---|---|
| QE | Quantum efficiency, i.e. the probability that a photon impinging on a pixel is converted into a photoelectron. |
| n(x, y) | Number of photoelectrons generated at pixel with coordinates (x, y) |
| v(x, y) | Voltage |
| $d_{adc}(x, y)$ | Digital number resulting from the digitization of the voltage generated by the photoelectrons from the pixel at coordinates (x, y) |
| M | Ensemble of captured digital values $d_{adc}(x, y)$, forming a raw digital image, before compression |
| Q | Ensemble of pixel values after they have undergone compression and decompression. |
| R, r | Compression ratio, i.e. size of the storage space required to store the input image divided by the size of the storage space required to store the compressed image. |
| T | Exposure time during which the image sensor absorbs photons and converts them to photoelectrons. |
| ζ | Factor relating the output $d_{adc}(x, y)$ of the analog-to-digital converter to the number of photoelectrons. |
| c | Offset constant relating the output $d_{adc}(x, y)$ of the analog-to-digital converter to the number of photoelectrons n(x, y). |
| A | Area observed by the pixel, this is a function of optics of the camera, and remains constant for our purposes. |
| Ω | Observed solid angle, also a function of the optics of the camera and just a constant in our treatment. |
| E | Photon energy |
| h | Plack's constant |
| c | Speed of light |
| Z | A constant $Z = \zeta QEA\Omega T/E$ |
| Δn | Uncertainty (standard deviation) in the number n of photoelectrons. |
| g | Precompression parameter |
| N(μ) | Poisson distribution of mean μ |
| $n_j$ | Number of samples |
| $d_c$ | Pre-compressed digital value |
| $d_o$ | De-compressed digital value |
| f | Compressed file, after lossless compression |
| F | De-compressed file |
| Δ(L, g), Δ | A Relative increase in uncertainty, here as a function of light hitting the pixel and pre-compression parameter, and on it's own. |
| $\langle \chi \rangle$ | Represents the mean of χ |
| $L_{max}$ | Maximum value of L to be tested when iterating |
| $g_{max}$ | Maximum value of g to be tested when iterating |

The invention claimed is:

1. A data compression method wherein said data comprises noise and information, comprising:
    a data acquisition step,
    a parameter determination step allowing to determine pre-compression parameters which are linked to an information loss,
    a compression step, and
    a storage step,
    said compression step comprising
    a lossy pre-compression for removing some noise of the data followed by
    a lossless compression for compressing the remaining data,
wherein:
    said parameter determination step comprises
        a system characterization step outputting the amount of image information that is lost by the compression algorithm as a function of pre-compression parameters and
        a pre-compression parameter selection step allowing to choose appropriate pre-compression parameters,
    said lossy pre-compression being carried out using the pre-compression parameters selected in the pre-compression parameter selection step, and
    said parameter determination step determines an upper bound on information loss and pre-compression parameters adapted to remove noise within said upper bound on information loss.

2. The data compression method of claim 1, wherein said parameter determination step determines said pre-compression parameters by establishing a plot of the information loss vs. said pre-compression parameters.

3. The data compression method of claim 1, wherein the system characterization step comprises:
    setting the radiance of light L(x, y) to be measured, starting from L=0,
    acquiring a number of images through an image sensor, an amplifier and a converter,
    calculating an input uncertainty $\sigma_i(x, y)$ on the data,
    setting a set of pre-compression parameters g,
    applying a lossy pre-compression followed by a lossless compression to the data,
    decompressing the data,
    calculating an output uncertainty $\sigma_o(x, y)$ on the data,
    repeating the above steps by increasing L and g,
    reporting information loss as a function of the set of pre-compression parameters g,
    where
    L(x, y) is the radiance of light at point (x, y),
    g is the set of pre-compression parameters,
    $\sigma_i(x, y)$ is the uncertainty (standard deviation) associated with the measurement estimate of the radiance L(x, y) at point (x, y), before compression,
    $\sigma_o(x, y)$ is the uncertainty (standard deviation) associated with the measurement estimate of the radiance L(x, y) at point (x, y), after compression.

4. The data compression method of claim 1, wherein the lossy pre-compression of the data is applied in the natural, non-transformed space of the data.

5. A data decompression method comprising
    obtaining compressed data that have been compressed by the compression method of claim 1,
    obtaining an upper bound on information loss,
    decompressing the compressed data,
    determining an uncertainty on the decompressed data according to the following relation:

$$\sigma_o \langle L_o \rangle = \Delta(g, L_o) \times \sigma_i \langle L_i \rangle = 1.15 \times 1/\sqrt{n} = 1.15 \times 1/\sqrt{d_o}$$

where:
Δ(L, g), Δ is the relative increase in uncertainty, here as a function of light hitting the pixel and pre-compression parameter, and on its own,
$d_o$ is the de-compressed digital value,
$\sigma_o(x, y)$ is the uncertainty (standard deviation) associated with the measurement estimate of the radiance L(x, y) at point (x, y), after compression,
$\sigma_i(x, y)$ is the uncertainty (standard deviation) associated with the measurement estimate of the radiance L(x, y) at point (x, y), before compression,
$L_{oo}(x, y)$ is the estimate of radiance L(x,y) as derived from measurement, after compression,
$L_{oi}(x, y)$ is the estimate of radiance L(x,y) as derived from measurement, before compression,
g is the set of pre-compression parameters, and
$n_j$ is the number of samples.

6. The data decompression method of claim 5, wherein g is 2 and $\Delta(g, L_o)$ is 1.15.

7. The data compression method of claim 1, further comprising a method of decompression performed after the data compression method of claim 1 that produces compressed data, the method of decompression comprising:
obtaining the compressed data,
obtaining an upper bound on information loss,
decompressing the compressed data,
determining an uncertainty on the decompressed data according to the following relation:

$$\sigma_o/\langle L_o \rangle = \Delta(g, L_o) \times \sigma_i/\langle L_i \rangle = 1.15 \times 1/\sqrt{n} = 1.15 \times 1/\sqrt{d_o}$$

where:
$\Delta(L, g)$, $\Delta$ is the relative increase in uncertainty, here as a function of light hitting the pixel and pre-compression parameter, and on its own,
$d_o$ is the de-compressed digital value,
$\sigma_o(x, y)$ is the uncertainty (standard deviation) associated with the measurement estimate of the radiance $L(x, y)$ at point $(x, y)$, after compression,
$\sigma_i(x, y)$ is the uncertainty (standard deviation) associated with the measurement estimate of the radiance $L(x, y)$ at point $(x, y)$, before compression,
$L_{oo}(x, y)$ is the estimate of radiance $L(x,y)$ as derived from measurement, after compression,
$L_{oi}(x, y)$ is the estimate of radiance $L(x,y)$ as derived from measurement, before compression,
g is the set of pre-compression parameters, and
$n_j$ is the number of samples.

8. A non-transitory computer program run on a computer or a dedicated hardware device, adapted to carry out the method of claim 7.

9. A non-transitory computer program of claim 8, wherein the dedicated hardware device comprises a Field-Programmable Gate Array (FPGA).

* * * * *